(12) United States Patent
Smolka et al.

(10) Patent No.: US 11,136,969 B2
(45) Date of Patent: Oct. 5, 2021

(54) CRADLE BEARING ASSEMBLY OF SWASHPLATE TYPE HYDRAULIC AXIAL PISTON UNIT

(71) Applicant: DANFOSS POWER SOLUTIONS INC., Ames, IA (US)

(72) Inventors: Stanislav Smolka, Nordborg (DK); Jaromir Tvaruzek, Nordborg (DK)

(73) Assignee: Danfoss Power Solutions, Inc., Ames, IA (US)

( * ) Notice: Subject to any disclaimer, the term of this patent is extended or adjusted under 35 U.S.C. 154(b) by 0 days.

(21) Appl. No.: 16/792,489

(22) Filed: Feb. 17, 2020

(65) Prior Publication Data

US 2020/0291929 A1     Sep. 17, 2020

Related U.S. Application Data

(60) Provisional application No. 62/816,997, filed on Mar. 12, 2019, provisional application No. 62/876,858, filed on Jul. 22, 2019.

(51) Int. Cl.
| | |
|---|---|
| *F04B 1/2085* | (2020.01) |
| *F16C 19/50* | (2006.01) |
| *F16C 33/30* | (2006.01) |
| *F16C 33/58* | (2006.01) |
| *B33Y 80/00* | (2015.01) |

(52) U.S. Cl.
CPC .......... *F04B 1/2085* (2013.01); *F16C 19/502* (2013.01); *F16C 33/306* (2013.01); *B33Y 80/00* (2014.12); *F05B 2240/50* (2013.01); *F16C 33/588* (2013.01); *F16C 2360/42* (2013.01)

(58) Field of Classification Search
CPC .... F16C 19/502; F16C 33/306; F16C 33/588; F04B 1/2085; F03C 1/0671; F05B 2240/50
See application file for complete search history.

(56) References Cited

U.S. PATENT DOCUMENTS

| 8,998,489 B2* | 4/2015 | Vornehm | F16C 19/502 |
| | | | 384/2 |
| 9,157,423 B2 | 10/2015 | Tvaruzek | |
| 9,194,469 B2* | 11/2015 | Tvaruzek | F16C 27/00 |
| 2006/0291765 A1 | 12/2006 | Hayward et al. | |
| 2013/0004342 A1* | 1/2013 | Fritz | F16C 33/306 |
| | | | 417/222.1 |

FOREIGN PATENT DOCUMENTS

| EP | 3084240 A2 | 10/2016 |
| JP | 2010127450 A | 6/2010 |

OTHER PUBLICATIONS

JP2010127450A—English Translation.
(Continued)

*Primary Examiner* — James Pilkington
(74) *Attorney, Agent, or Firm* — Zarley Law Firm, P.L.C.

(57) ABSTRACT

A bearing assembly having an inner race, an outer race, and a plurality of rollers positioned between the inner race and the outer race. A pad is attached to the inner race and a bed is attached to the outer race. A timing mechanism is slidably mounted to the pad and the bed. Preferably the pad and bed are made of plastic and the inner race is embedded within the pad and the outer race is embedded within the bed.

18 Claims, 4 Drawing Sheets

(56) References Cited

OTHER PUBLICATIONS

European Patent Office, European Search Report, Danfoss Power Solutions Inc., EP Appl. No. 20155647.9, dated Jul. 20, 2020, 10 pages.
Chinese First Office Action issued by the China National Intellectual Property Administration dated May 27, 2021, Chinese Patent Appl. No. 202010164004.9, Danfoss Power Solutions Inc., 8 pages.
Chinese First Office Action Summary-English Translation.

\* cited by examiner

CRADLE BEARING ASSEMBLY OF SWASHPLATE TYPE HYDRAULIC AXIAL PISTON UNIT

CROSS REFERENCE TO RELATED APPLICATIONS

This Application claims the benefit of the priority of U.S. Provisional Application No. 62/816,997 filed on Mar. 12, 2019 and U.S. Provisional Application No. 62/876,858 filed on Jul. 22, 2019, the contents of these applications are hereby incorporated by reference in their entirety.

BACKGROUND OF THE INVENTION

The present invention is directed to a swash plate roller cradle bearing assembly for a hydraulic axial piston unit and more particularly, a roller cradle bearing assembly which is less demanding on tooling and more economical to manufacture.

Such cradle bearing assemblies are well known in the art for use with hydrostatic units having a swash plate design. Cradle bearing assemblies are particularly useful as they require less space. Journal bearings are cost effective but they have higher friction, while roller bearings have lower friction but they are more expensive. Cradle roller bearings using a cylindrical surface of the swash plate as a running surface are demanding on the swash plate processing and assembly as the swash plate commonly is a forged part and a running surface on the swash plate has to be hardened to fulfill this purpose. In order to avoid the hardening process of the swash plate, cradle bearing assemblies are used in the art having an inner bearing ring-segment fixed to the swash plate and an outer bearing ring-segment fixed to the housing of the hydraulic unit. Between the inner and the outer ring-segments bearing rollers are located running on race surfaces on respective surfaces of the bearing ring-segments facing each other. The present inventions aims to reduce complexity and manufacturing costs of both the swash plate and the cradle bearing assembly, thereby reducing friction and wear while augmenting life-span.

The primary challenge with existing roller cradle bearing assemblies is the cost and difficulty of manufacture. Existing unitized roller cradle bearings include roller elements, inner and outer races on the respective inner and outer bearing ring-segments, and a timing mechanism. All of these parts are currently made of metal which places a demand on tooling and adds to the cost. There also exist issues with swash plate bending, vibration, and noise.

Hence, an objective of the present invention is to provide a cradle bearing assembly that is more cost effective as well as manufacturing and assembly friendly, wherein wear and friction is reduced and life-span enlarged. Furthermore the inventive cradle bearing assemblies preferably should be usable in already existing designs for of the swash plate type of construction hydraulic axial piston units and can serve in some cases as replacement part for existing hydraulic axial piston units.

A solution to the current problem is given by a cradle bearing assembly according to the disclosure. Here the geometric complexity of existing cradle bearing assemblies is transferred to plastic or composite plastic parts which can be manufactured by injection moulding or in additive manufacturing (AM), like 3D printing, selective laser sintering, fused deposition modelling, laminated object modelling, or the like. These non-metallic parts can thereby be composed of single polymer materials or composite materials or other non-metal material. Other parts where load and relative movement are absorbed, remain as very simple geometric metal parts plus standard rollers or needles. This new solution includes the assembly of steel inner and outer races connected to or embedded within a plastic or composite material body to form the inner and outer ring-segments. The plastic or composite material body is used for assembly, mounting tabs, and a timing mechanism while the metal races evenly distribute the load from the roller to the inner and outer plastic bodies which in turn dampen and distribute the load to the housing and the swash plate cradle surface, respectively.

According to the invention the ring-segment bodies of the inner and the outer ring-segment are made of plastic or composite (reinforced) plastic material assuming all the complex geometrical features for receiving and holding fixedly the races, for assembling the cradle bearing ring-segments, and for mounting the cradle bearing assembly in a hydrostatic unit. The races on which the rollers run can thus simply be formed as a metal band, e.g. a pre-curved or planar steel band bent into final curvature when assembled to the respective inner or outer body of the respective ring-segment. Thus, the inner and outer ring-segments of the cradle bearing assemblies according to the invention are composite parts, wherein the geometric complex function is assumed by the plastic or composite reinforced plastic part and the heavy loaded function is assumed by metal parts of simple standard geometry.

The compliance of the composite material body leads to the more uniform contact pressure distribution between roller and races. It reduces impact of the swash plate bending and enables using of rollers having a bigger axial length-diameter ratio which provides more stable support. The use of plastic/synthetic/composite materials for the ring-segment bodies—further on called also pads for the body of the inner ring-segment and beds for the body of the outer ring-segment—resulting in lower vibration and noise as these materials are selectable to have an improved damping characteristic as compared to forged and hardened metal. Further, the use of plastic/synthetic/composite material for the ring-segment bodies reduces manufacturing costs, as these parts can be realized by moulding, injection moulding, and/or Additive Manufacturing. Therewith, manufacturing time and energy consuming processes like forging, machining, hardening, etc. can be avoided or reduced to a minimum.

The use of plastic or plastic composite material parts provides for a uniform contact pressure between rollers and races as well as a uniform contact pressure between the ring-segments and the mounting surfaces at the swash plate and the housing.

These and other advantages will be more apparent to those having skill in the relevant art based upon the above and following written description, drawings, and claims.

SUMMARY OF THE INVENTION

In a preferred embodiment according to the invention a swash plate cradle bearing assembly for hydrostatic axial piston units have a plurality of rollers disposed between an inner race and an outer race. A pad/inner body of non-metallic, plastic/synthetic/composite material is attached to the inner race forming therewith the inner ring-segment, and a bed/outer body of non-metallic, plastic/synthetic/composite material is attached to the outer race forming therewith the outer ring-segment. Thereby the non-metallic, plastic/synthetic/composite material of the pad need not to be the non-metallic plastic/synthetic/composite material of the bed. Preferably, the pads and beds are made of a composite material with the inner race embedded within the pad and the outer race embedded within the bed. This, e.g. can be done in an injection moulding process, by 3-D printing, by a laser-sintering process, or an assembly process using, e.g. a laser, heat, or ultrasonic welding or simply by clicking-in the races in the pads and beds. A person with skills in the relevant will see here a lot of further possibilities to assemble the correspondent inner and outer races to the respective pad and bed, i.e. to the inner and outer bodies of the ring-segments.

A timing mechanism connected to the roller elements or a cage within which the roller bodies are disposed and guided, is mounted to the pad and the bed such that the rollers of the cradle bearing assemblies can follow the pivoting motion of the swash plate in a rolling motion without slipping. In one example, the timing mechanism is slidably mounted within grooves formed by inner surfaces of side walls on the pad and bed. In another example, the timing mechanism comprises a gear wheel mounted to the cage, which engage both the pad and the bed at suitable, e.g., at projections that extend outwardly from side walls of the pad and bed. As the pad follows the pivot motion of the swash plate and the bed is stationary with respect to the housing, the cage is forced to follow the pivot motion of the swash plate according to the transmission ratio of the gear wheel and the toothed areas on the pad and the bed protrusions. This transmission ratio is preferable adapted to the diameter of roller bodies used.

DETAILED DESCRIPTION OF THE PREFERRED EMBODIMENTS

Figure 1:
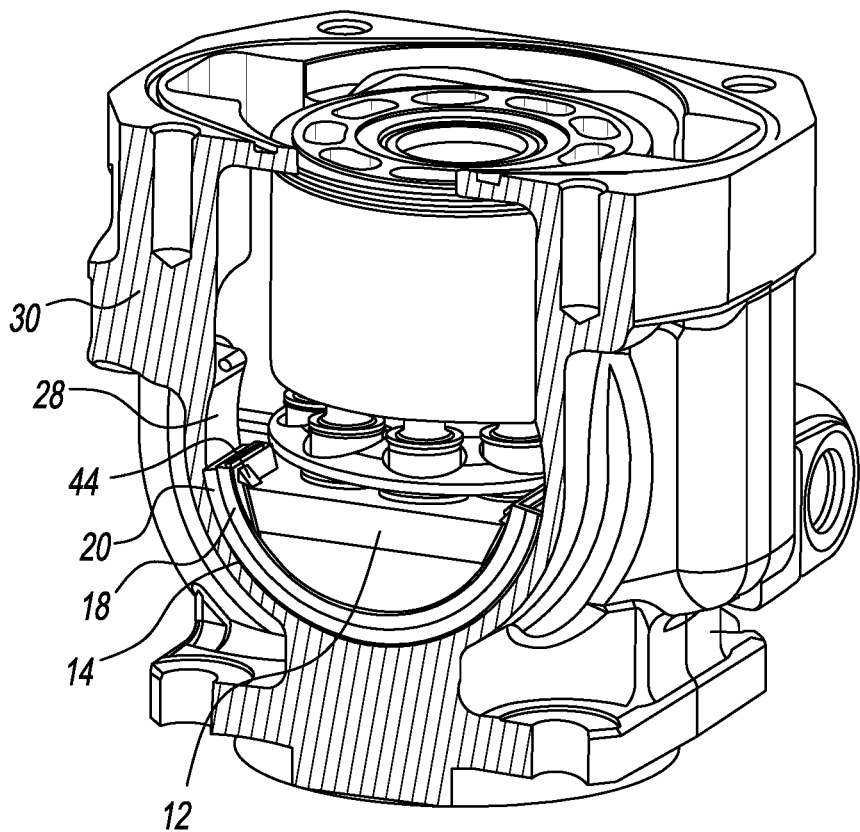
FIG. 1 is a perspective view of a hydrostatic unit according to the prior art.
Figure 2:
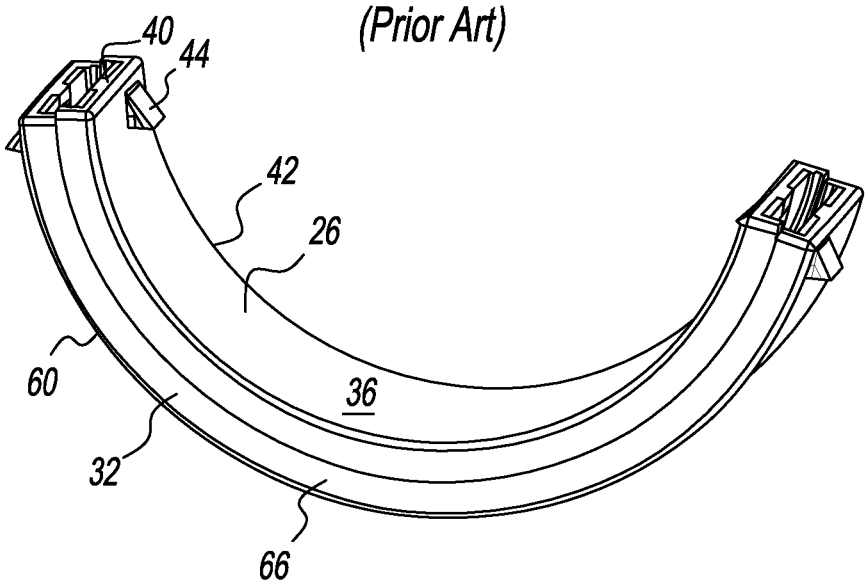
FIG. 2 is a perspective view of a cradle bearing assembly according to the prior art.

Referring to the Figures, in FIG. 1 a perspective view of a prior art hydrostatic unit of the swashplate type is shown, comprising a cradle swash plate 12 having a planar cam surface 14 in form of a partial cylinder surface shell. The cradle swash plate 12 is supported by a cradle bearing assembly 10 according to the state of the art. The cradle bearing assembly 10 according to the prior art as shown in FIG. 2 has a plurality of roller elements 16 (not shown in FIGS. 1 & 2) such as rollers, needles, balls or the like. The roller elements 16 are positioned between an inner race 18 disposed on an inner body (pad or bed) 26 and an outer race 20 disposed on an outer body (pad or bed) 32 which are both made of steel or a material having similar qualities. Inner body 26 and an outer body 32 comprise mounting tabs 44 and 64 for mounting the inner body 26 and an outer body 32 to cradle swash plate 12 and housing 30, respectively.

Figure 3:
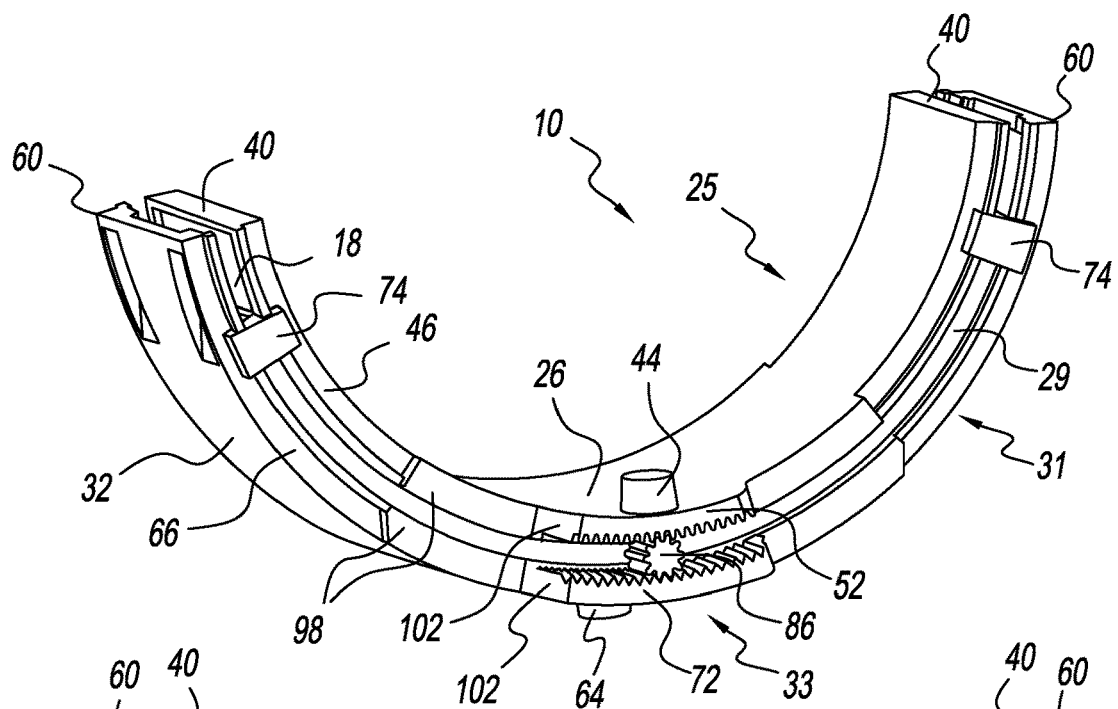
FIG. 3 is a perspective view of a first embodiment of the cradle bearing assembly according to the invention.
Figure 4:
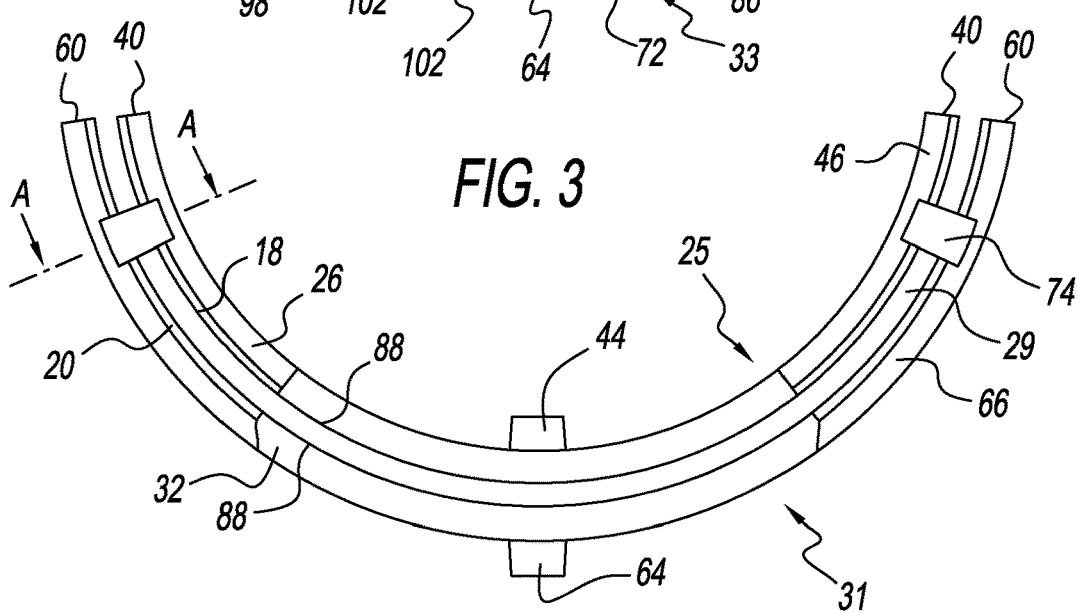
FIG. 4 is a side view of a second embodiment of the cradle bearing assembly according to the invention.

FIGS. 3 and 4 show perspective views of two embodiments for a cradle bearing assembly 10 according to the invention. Positioned between the planar, respectively, cylindrical surface 14 of the cradle swash plate 12 (see FIG. 1) and the inner race 18 is a pad 26—also called inner bed/inner body 26—that is preferably made of a plastic or composite material, like a glass fibre reinforced plastic material. Alternatively, other non-metal materials can be used. Similarly, positioned between the outer race 20 and an inner surface 28 of a hydraulic unit housing 30 (see FIG. 1) is a bed 32—also called outer bed/outer body 32—that is preferably made of a plastic or composite material or other non-metal material also. Thereby the inner body 26 and the outer body 32 can be made of the same or different non-metallic materials, preferably a plastic or composite material. The pad 26 or the bed 32 include mounting tabs 44 and 64 (see FIG. 6) and a timing mechanism 33 also made of a plastic or composite material. The pad 26 and bed 32 are preferably made in an injection moulding process or using an additive manufacturing (AM) or 3D printing process. According to the invention, the inner race 18 and outer race 20 made of metal, preferably of steel bands with a standard geometry, are embedded within the pad 26 and the bed 32. The roller elements 16 positioned between the inner race 18 and the outer race 20 transfer the load from the cylindrical surface 14 of the cradle swash plate 12 to the inner surface 28 of housing 30, thereby enabling low actuation forces for pivoting the swash plate, which allow also low pump or motor hysteresis.

Figure 5:
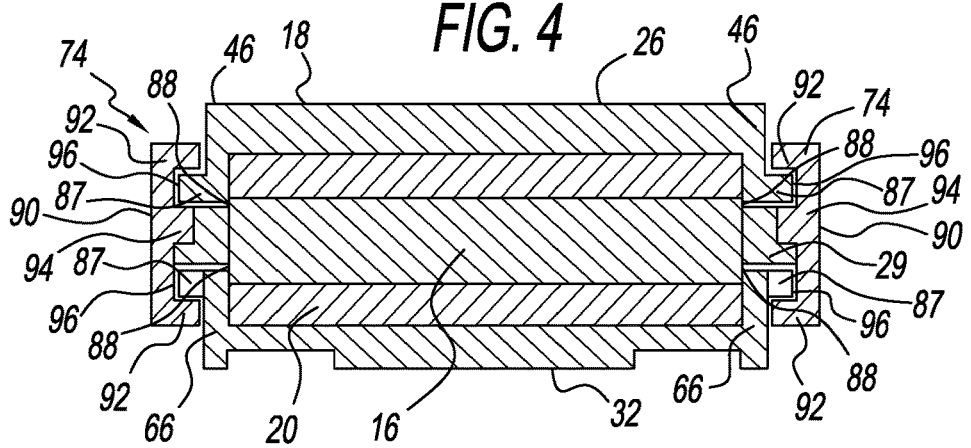
FIG. 5 is section view of a cradle bearing assembly according to section line A-A of FIG. 4.

The inner race 18 and outer race 20 are arcuate in shape and convex in relation to the cam surface 14 of the swash plate 12 (not shown in FIGS. 3 & 4). The inner race 18 and outer race 20 are fixedly joint to inner pad 26 and outer bed 32 by means of clipping together, by welding, gluing or the like, thereby forming corresponding inner and outer bearing shells 25 and 31 having the form of ring-segments. These two bearing shells 25 and 31 can slide relative to each other in circumferential direction supported by roller elements 16 (see FIG. 6). The embodiments of FIGS. 3 and 4 each comprise a bearing cage 29 for holding and guiding the rollers 16. The inner bearing shell 25, the outer bearing shell 31, and bearing cage 29, are held together by assembly tabs 74. A section through the inventive cradle bearing assembly 10 passing one of these assembly tabs 74 is shown with FIG. 5. Here it can be seen that inner body 26 as well as outer body 32 comprise outwardly protruding flanges 87, on which the assembly tab 74 is mounted in the way of a bracket, holding together in radial direction the two shells, 25 and 31, with the cage 29 in between. Preferably assembly tabs 74 are jointly fixed to the bearing cage 29 such that the assembly tabs 74 can move in circumferential direction together with bearing cage 29.

Bearing cage 29 is forced to move in circumferential direction when inner bearing shell 25 pivots with the cradle swash plate 12 and the roller elements 16 are caused to turn due to friction of the inner race 18 on the roller elements 16. In order to carry along the bearing cage 29 with the roller elements 16, or the roller elements 16 only together with the pivoting inner bearing shell 25, sufficient friction between the inner race 18 and roller elements 16 is necessary to cause them to turn, and, at the same time, the friction between the roller elements 16 and the outer race 20 have to be sufficiently high, such that the rotating motion of the rollers 16 is converted to a circumferential motion of the roller elements 16 and/or the bearing cage 29, respectively. This circumferential motion of the roller elements 16 and/or the bearing cage 29 is necessary that the pressure force transmitted from the working pistons of the hydraulic unit via the cradle swash plate 12 onto the cradle bearing assembly 10 is distributed on the maximal number of roller elements 16 at each and every displacement angle to which the swash plate 12 can be placed. A person skilled in the relevant art knows that these can only be achieved when the circumferential length of the inner race 18 and the outer race 20 is covered only partially by the roller elements 16 and therefore a timing mechanism 33 is preferred to ensure that the roller elements 16 are carried along the races 18 and 20 when the swash is pivoted.

Figure 6:
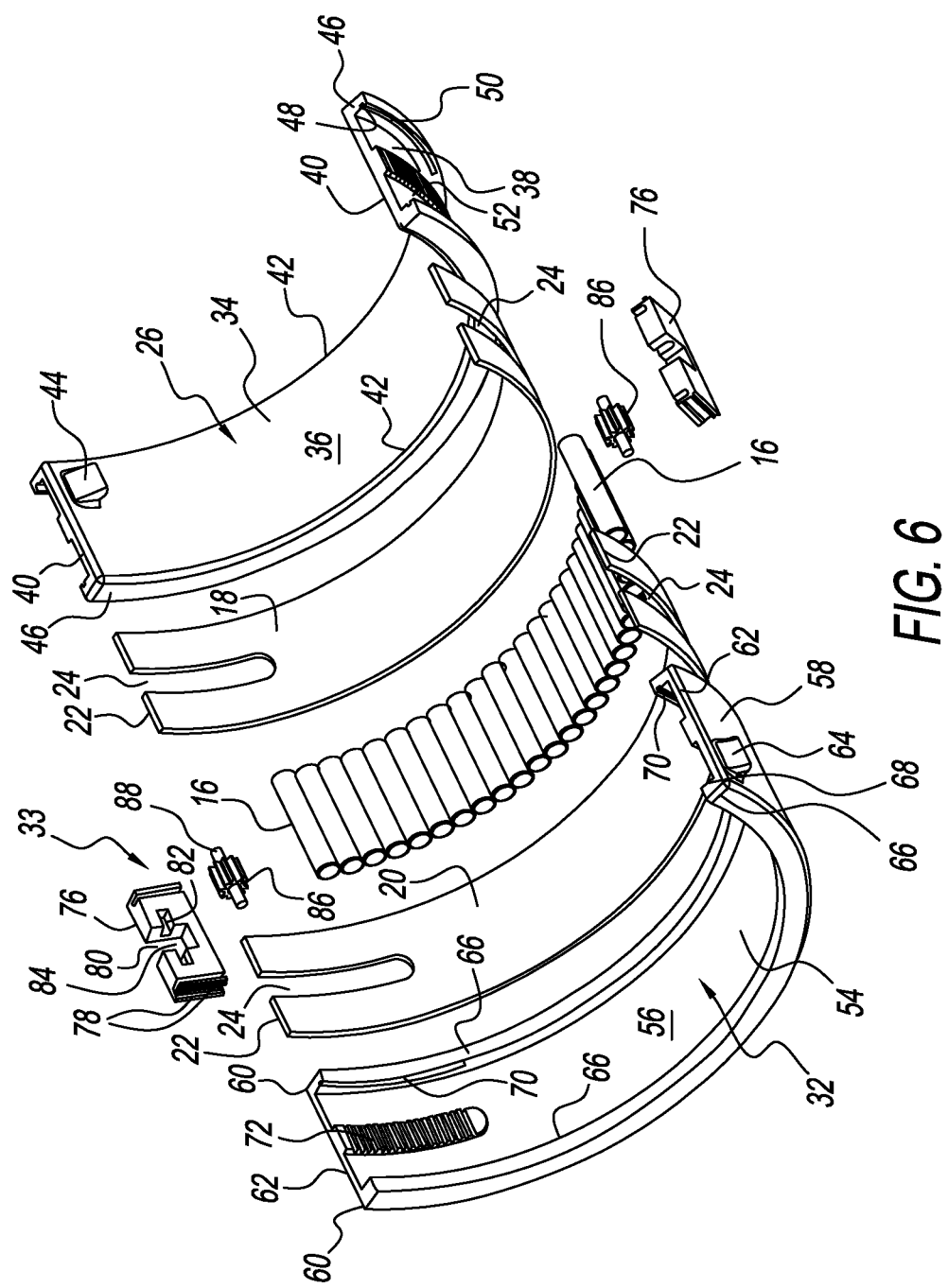
FIG. 6 is an exploded view of a cradle bearing assembly according to the second embodiment of the invention.

The two examples for timing mechanisms 33 shown in FIGS. 3 and 6 use a sprocket 86 or a gear wheel 86 fixed to the bearing cage 29, which engages with both the inner body 26 and the outer body 32 in the assembled state of the cradle bearing assembly 10. When the inner bearing shell 25 pivots, gear wheel 86 turns and carries the bearing cage 29 along in the circumferential direction as the outer bearing shell 31 is stationary with the housing 30. By using a sprocket 86 or a gear wheel 86, respectively, the friction dependency to cause the roller elements 16 to move in circumferential direction is obsolete.

For implementation of such a timing mechanism 33, FIGS. 3 and 6 show two examples:
  (i) (see FIG. 3) One sprocket 86 arranged laterally on cradle bearing assembly 10 and engaged with both a row of teeth 52 is disposed on the inner body 26 and outer body 31 on outwardly extending flanges 98, wherein the rows of teeth 52 and 72 are facing each other;
  (ii) (see FIG. 6) Inside the axial width of cradle bearing assembly 10, one row of teeth 52 and 72 on each circumferential end region 62 of the inner body 26 at the outer side 38 facing the outer body's 32 inner side 56 also comprising rows of teeth 72 facing the inner body's 26 outer side 38, a sprocket 86 is provided one at each end region 62 of the cradle bearing assembly 10.

In a further preferred embodiment the sprockets 86 are accommodated in support members 76 which are slidably disposed between the inner body 26 and the outer body 32 at the respective end regions 62. Thereby the support members 76 can be guided with pairs of projections 78 in grooves 50 in the inner body 26 and in grooves 70 in the outer body 32. Therewith the support members 76 can assume the function of the assembly tabs 74 shown with the embodiment of FIG. 3.

For implementing the timing mechanism 33 of FIG. 6 at each end 22 of the inner 18 and outer 20 races a central slot 24 is located that extends partially from the end 22 toward an opposite end. The races 18 and 20, together with the roller elements 16, transform the load from the swash plate 12 and provides a small resistance to stroke the swash plate 12. The simple shape and configuration of the inner and outer races 18 and 20 simplifies and optimizes the manufacturing process which leads to improved quality. The complex geometry needed for fulfilling the other less-load-bearing functions of the cradle bearing assembly according to the invention can be realized with the inner body 26 and the outer body 32 made of a plastic or composite material. This composite assembly of the cradle bearing assembly 10 according to the invention provides furthermore for better manufacturing and assembly tolerance compensation in hydraulic units of the cradle bearing type and the parts thereof and, simultaneously, for better dampening properties which reduces inter alia running noises.

In the exploded view of FIG. 6 of a cradle bearing assembly 10 according to the invention, it can be detected further that the inner bed 26 is made of any size, shape, and structure. In one example, the inner bed 26 has an arcuate wall 34 with a first surface 36, a second surface 38, ends 40, and side edges 42. Positioned adjacent the ends 40 on the first surface 36 of the arcuate wall 34 are tabs 44 adapted to connect the inner bed 26 to the swash plate 12.

Positioned on the side edges 42 and extending away from the swash plate 12 are side walls 46. At each end 40, on an inner surface 48 of the side walls 46, are grooves 50 that extend partially from one end 40 toward an opposite end. Also, on the second surface 38, extending partially from the ends 40 toward the opposite ends, is a row of teeth 52. The teeth 52 are positioned to align with the slots 24 on the inner race 18. The inner race 18 and a portion of the roller elements 16 are received within the side walls 46 of the inner bed 26.

In a similar manner, the outer bed 32 is made of any size, shape, or structure. In one example, the outer bed 32 has an arcuate wall 54 with a first surface 56, a second surface 58, side edges 60, and ends 62. Positioned adjacent the ends 62 on the second surface 58 of the arcuate wall 54 are tabs 64 adapted to connect the outer bed 32 to housing 30.

Positioned on the side edges 60 and extending away from the housing 30 toward the swash plate 12 are side walls 66. At each end 62, on an inner surface 68 of the side walls 66, are grooves 70 that extend partially from one end 62 toward an opposite end. On the first surface 56, extending partially from ends 62 toward the opposite ends, is a row of teeth 72. The teeth 72 are positioned to align with the slots 24 on outer race 20. The outer race 20 and a portion of the roller elements 16 are received within side walls 66 of the outer bed 32.

Slidably mounted to both the inner and outer beds 26 and 32 is a timing mechanism 33. The timing mechanism 33 includes a pair of support members 76 having a pair of outwardly extending projections 78 on each end. The projections 78 are positioned to align with, and adapted to be slidably received within, grooves 50 and 70.

The support members 76 also have a cut-out 80 having a shaft section 82 and a sprocket section 84. The cut-out 80 is adapted to rotatably receive a sprocket 86 mounted to a shaft 88 in the respective sections 82 and 84. Once the inventive cradle bearing assembly 10 is mounted, the sprocket 86 aligns with and engages rows of teeth 52 and 72.

In operation, as the swash plate 12 tilts or pivots on the cradle bearing assembly 10, the inner bed 26 attached to the swash plate 12, and inner race 18, rotate in relation to the outer race 20 and outer bed 32. As the inner bed 26 rotates, the support members 76 slide within grooves 50 and 70, as the sprockets 86 are forced to roll along the rows of teeth 52 and 72. The support members 76 slide until projections 78 engage an inner end of grooves 70 causing at one end 40 rotation of the inner bed 26 to stop, wherein the support member 76 on the other circumferential end 40 of cradle bearing assembly 10 holds the roller elements 16 at the most displaced position. A person skilled in the relevant art detects from this that one support member 76 with its engaged sprocket 86 causes the roller elements 16 to move in circumferential direction when the displacement angle of the swash plate 12 is changed.

The thickness of the composite material of the inner bed 26 is adapted to reduce the impact of deformation coming from the swash plate. The inner and outer races made of metal stripes, e.g., transfer intensive line contact between the rollers 16 and the races 18 and 20 into a uniform compressive load handled by the inner bed 26 and outer bed 32.

The use of the composite construction of the cradle bearing assembly 10 according to the invention with plastic (composite) material for the inner and outer beds 26 and 32 and the metal material for the inner and outer races 18 and 20 permit the use of rollers 16 having a greater length-diameter ratio than rollers used in the prior art, which help to reduce vibration and construction space. The timing mechanism 33 can hold the inner and outer beds together. The use of a bearing cage 29 hold the rollers in the space between the races aligned and corrects the roller's position in case of rolling, vibration and sliding while the swash plate 12 pivots.

In another embodiment, exemplarily shown with FIG. 3, the side walls 46 and 66 of the inner 26 and outer beds 32 have outwardly extending projections or flanges 87 at an inner edge 88 of the side walls 46 and 66. The projections 87 extend from each end 40 and 60 partially toward the circumferential center of the inner 26 and outer 32 beds.

The projections 87 slidably receive assembly tabs 74. The assembly tabs 74 have elongated portions 90 with a transverse or perpendicular section 92 at each end. In between the two end sections 92 is a transverse or perpendicular center section 94 that is in spaced relation to the end sections 92 to form a pair of slots 96. The projections 86 are received within the slots 96 and the center section 94 extends between the inner 26 and outer beds 32 where the center section 94 is connected to a roller 16 or bearing cage 29 at each end. In this embodiment the inner 18 and outer 20 race do not have a slot 24 that aligns with a row of teeth 52 and 72.

As shown with FIG. 3, at the center of both the inner 26 and outer 32 beds one of the side walls 46 and 66 having a first outwardly extending flange 98. The flange 98 has an axially outward face that includes a second outwardly extending flange 102 and connected to radially facing surfaces of flange 98 are mounting tabs 44 and 64. Positioned between the flanges 102 is a sprocket 86 engaged with rows of teeth 52 and 72 facing each other. This forms an alternative timing mechanism 33 analogous to the one descript above with FIG. 6. Hence when inner bearing shell 25 moves circumferentially with the swash plate 12 roller elements 16 or the bearing cage 29 are/is forced to follow that circumferential motion as outer bearing shell 31 is stationary with respect to the housing 30.

Figure 7:
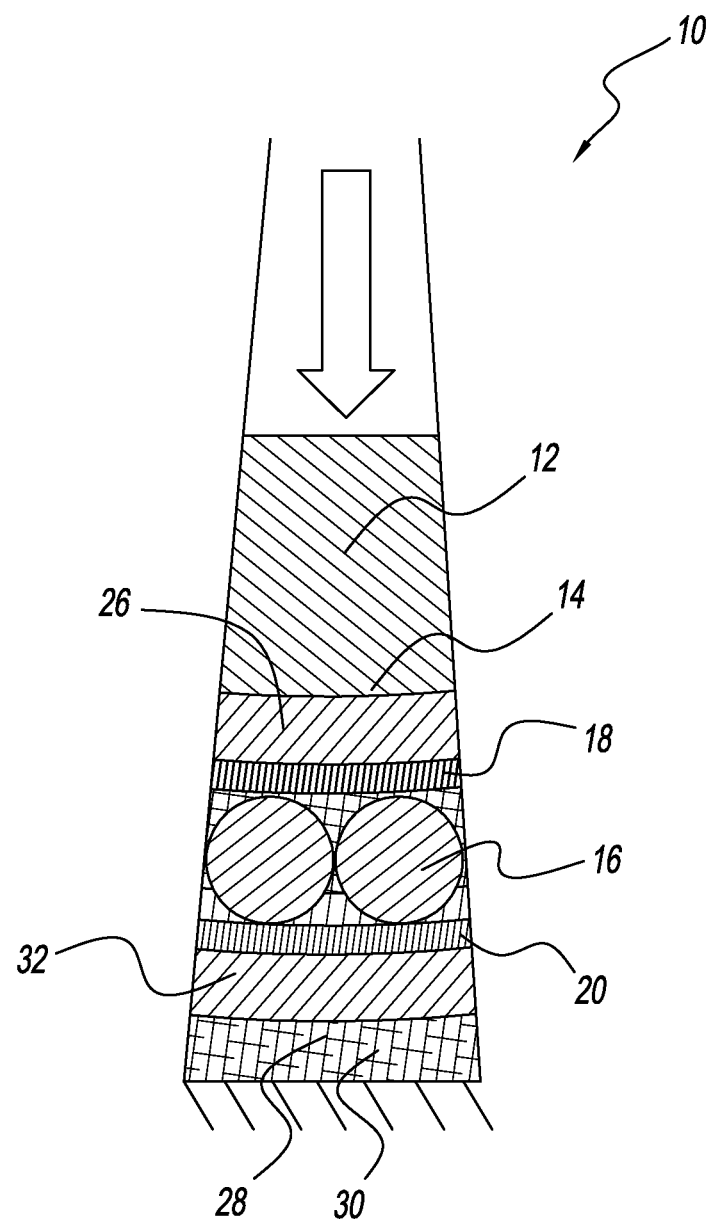
FIG. 7 is a side section view of a cradle bearing assembly according to the invention.

FIG. 7 shows a side section view of a cradle bearing assembly 10 according to the invention, from which it can be seen that the radial forces transmitted from the system pressure via the working pistons of the hydraulic unit onto the swash plate 12 with its cylindrical surface 14 are assumed first by inner body 26 and transmitted via inner race 18 onto roller elements 16 and further on to outer race 20 and outer body 32 which is supported by housing 30 of the hydraulic unit. A person skilled in the relevant art derives from FIG. 7 that the inventive cradle bearing assembly 10 has advanced dampening properties compared to cradle bearings known from the art made entirely of metal material. A person skilled in the relevant art further derives from this inventive composite cradle bearing assembly 10 that manufacturing cost and assembly cost can reduced significantly as complex geometry can be realized with plastic or composite plastic components in an injection moulding or additive manufacturing process, and as the running surfaces of the inner and outer races 18 and 20 are realized on geometrical simple components which can made of metal stripes, like steel bands or the like.

From the above discussion and accompanying Figures and claims it will be appreciated that a cradle bearing assembly 10 according to the invention offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

Accordingly, a cradle bearing assembly has been shown that at the very least meets all the stated objectives.

What is claimed is:

1. A bearing assembly for hydrostatic axial piston units of the swash plate type, comprising:
   an inner race made of metal, an outer race made of metal, and a plurality of roller elements positioned between the inner race and the outer race;
   a pad attached to the inner race for forming an inner bearing shell, the pad comprising an axially outwardly protruding projection;
   a bed attached to the outer race for forming an outer bearing shell, the bed comprising an axially outwardly protruding projection; and
   an assembly tab mounted to the pad and the bed, wherein the assembly tab engages the axially outwardly protruding projection of the pad and the axially outwardly protruding projection of the bed in a manner that holds the pad and the bed together.

2. The bearing assembly of claim 1, wherein the pad and the bed are made of a plastic or a composite material.

3. The bearing assembly of claim 1, wherein the inner race is embedded within the pad and the outer race is embedded within the bed.

4. The bearing assembly of claim 1, wherein each end of the inner race and the outer race have a centrally located slot.

5. The bearing assembly of claim 1, wherein a sprocket of a timing mechanism engages a row of teeth on the ends of the pad and the bed.

6. The bearing assembly of claim 5, wherein the sprocket is mounted in a support member disposed slidably within grooves on inner surfaces of side walls on the pad and the bed.

7. The bearing assembly of claim 5, wherein the sprocket is received within flanges that extend outwardly from side walls of the pad and the bed.

8. The bearing assembly of claim 1, wherein the pad and the bed are made using an additive manufacturing process.

9. The bearing assembly of claim 1 further comprising the pad having a mounting tab and the bed having a mounting tab.

10. The bearing assembly of claim 1 wherein the assembly tab is jointly fixed to a bearing cage such that the assembly tab moves in a circumferential direction together with bearing cage.

11. The bearing assembly of claim 1 wherein the axially outwardly protruding projections of the pad and the bed extend from side walls of the pad and the bed.

12. The bearing assembly of claim 11 wherein the assembly tab slidably receives the axially outwardly protruding projections.

13. The bearing assembly of claim 11 further comprising the assembly tab having an elongated portion with a transverse section at each end and a central section in between each end such that a pair of slots are formed between the transverse sections.

14. The bearing assembly of claim 13 wherein the axially outwardly protruding projections are received within the pair of slots and the central section extends between the pad and the bed.

15. A bearing assembly for hydrostatic axial piston units of the swash plate type, comprising:
   an inner race made of metal, an outer race made of metal, and a plurality of roller elements positioned between the inner race and the outer race;
   a pad attached to the inner race for forming an inner bearing shell;
   a bed attached to the outer race for forming an outer bearing shell;
   a circumferential center of the pad having a side wall with a first outwardly extending flange including an axially outward face, the axially outward face includes a second outwardly extending flange;
   a circumferential center of the bed having a side wall with a first outwardly extending flange including an axially outward face, the axially outward face includes a second outwardly extending flange;
   the second outwardly extending flange of the pad and the second outwardly extending flange of the bed having opposing teeth; and
   a sprocket positioned between and in engagement with the opposing teeth.

16. A bearing assembly for hydrostatic axial piston units of the swash plate type, comprising:
   an inner race made of metal, an outer race made of metal, and a plurality of roller elements positioned between the inner race and the outer race;
   wherein each end of the inner race and the outer race have a centrally located slot that extends partially from one end towards the opposing end;
   a pad attached to the inner race for forming an inner bearing shell;
   wherein each end of the pad has teeth that extend partially from one end towards the other in alignment with one of the centrally located slots;
   a bed attached to the outer race for forming an outer bearing shell; and
   wherein each end of the bed has teeth that extend partially from one end towards the other in alignment with one of the centrally located slots.

17. The bearing assembly of claim 16 further comprising a timing mechanism slidably mounted to the pad and the bed, wherein the timing mechanism has a pair of support members with a pair of outwardly extending projections that are received within grooves in the bed and the pad.

18. The bearing assembly of claim 17 wherein the grooves are formed in side walls of the pad and the bed such that the support member is slidably disposed within the pad and the bed and holds the pad and the bed together.

* * * * *